INVENTOR
JAMES W. GRYGERA

ATTORNEYS

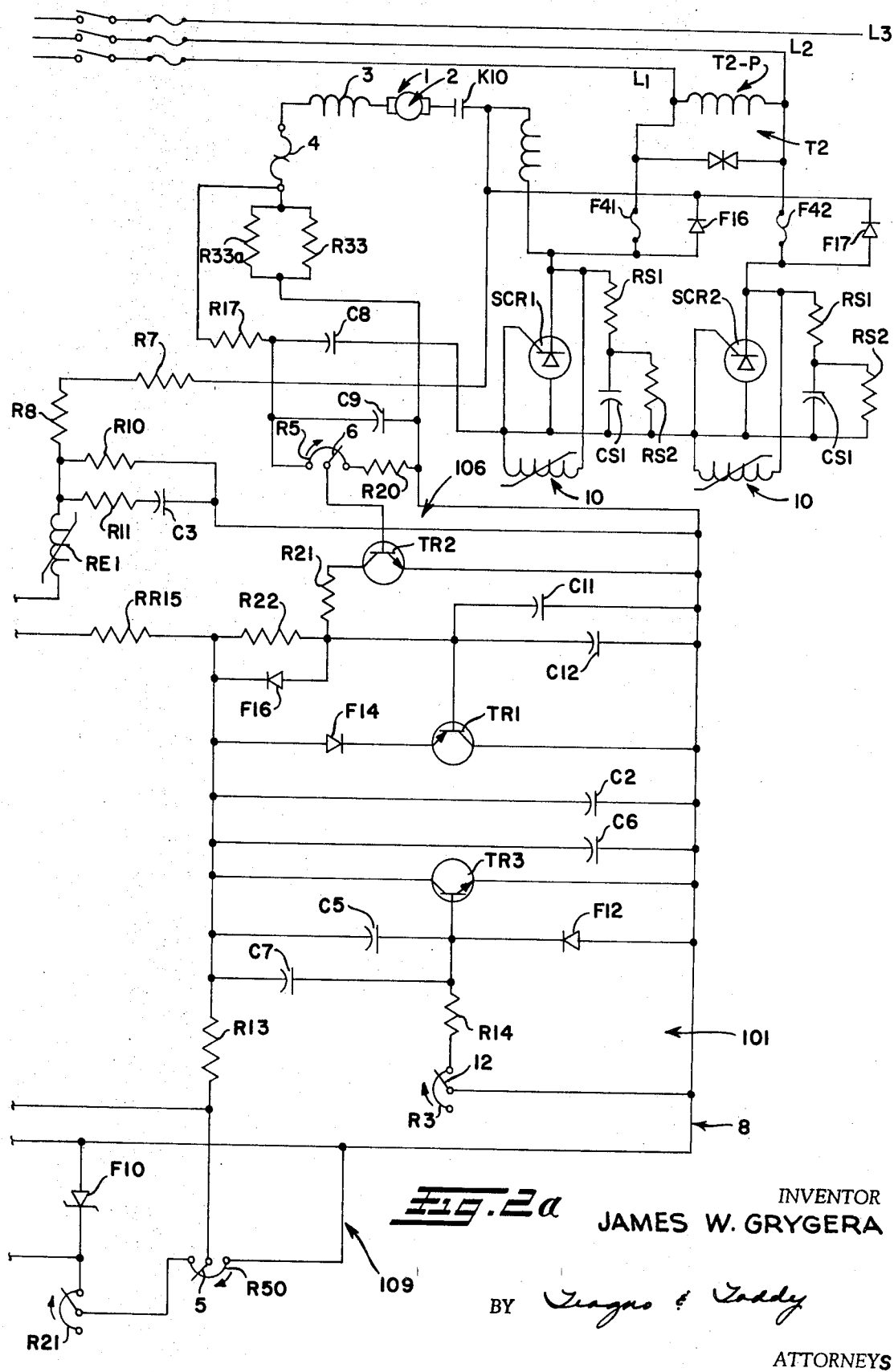

United States Patent Office 3,543,115
Patented Nov. 24, 1970

3,543,115
ELECTRIC MOTOR SPEED CONTROL
James W. Grygera, Kenosha, Wis., assignor to Eaton Yale & Towne Inc., Cleveland, Ohio, a corporation of Ohio
Filed Sept. 26, 1967, Ser. No. 670,542
Int. Cl. H02p 5/18
U.S. Cl. 318—308                                      7 Claims

ABSTRACT OF THE DISCLOSURE

A control is disclosed for operating a dynamoelectric device such as a DC motor or the like. The speed of the DC motor is controlled by providing a tachometer generator feedback signal and a back EMF feedback signal, both of which are proportional to the speed of the motor which is controlled. The feedback signals are combined with a reference potential which is proportional to a preselected speed of the motor. By combining the aforementioned signals the speed of the motor can be maintained substantially equal to the preselected speed even under variable load conditions.

Also, a means is provided for preventing the torque of the motor from exceeding substantially the rated torque of the motor which is controlled.

BACKGROUND OF THE INVENTION

This invention relates to a control for operating and controlling the speed and torque of a dynamoelectric device such as a DC motor under variable load conditions. In controls known heretofor it has been common to utilize either a tachometer feedback signal or a back EMF feedback signal both of which are proportional to the speed of the DC motor for controlling the motor speed. By combining either the tachometer feedback signal or the back EMF signal with a reference signal which is proportional to a preselected motor speed it has been possible to maintain the speed of the motor substantially equal to that of the preselected speed.

In the present invention, however, both the back EMF and tachometer feedback signals are separately combined with the reference signal. Also, the signal resulting from combining the tachometer feedback signal with the reference signal is integrated over an interval of time. The integrated signal and the signal resulting from combining the reference and back EMF sigals are applied to an amplifier which controls a power output device, such as an SCR for controlling the speed of the motor. Thus, it will be seen that tighter speed control is available which has not been heretofore available in the prior speed control systems.

SUMMARY OF THE INVENTION

This invention relates to a controlled velocity drive and more particularly to a solid state control for a dynamoelectric device, for example, a DC motor or the like. The present control system provides excellent speed regulations with optimum time response to speed and load changes while avoiding system instability.

Accordingly, an object of the invention includes the provision of a solid state control system for a dynamoelectric device, such as a DC motor, having exceptionally precise and improved speed regulation characteristics over an extensive speed range while being free of system instability.

Another object of the invention is that it provides optionally rapid response to abrupt load and speed changes. Still further objects are the provision of a speed control system wherein the dynamoelectric device is linearly accelerated from zero to a preselected speed at substantially a linear rate; the provision for a speed control system which is critically damped so that optimum response to speed and load changes is obtained while undesirable system oscillations are overcome; the provision of a speed control system wherein the level of torque developed is controlled so that it does not exceed substantially the rated torque of the machine; and the further provision of a speed control system which is relatively inexpensive to manufacture and easy to maintain and which is extremely reliable.

Other objects and features of the invention will be in part apparent and in part pointed out hereinafter.

In its broader aspects the invention is directed to a solid state control for a dynamoelectric device such as a DC motor wherein the energization of the armature member is controlled so that the speed of the motor substantially corresponds to a preselected motor speed at all times, even under variable load conditions.

The control comprises a means for generating a reference potential or voltage signal which is proportional to a preselected speed of the motor. Also included is a means for substantially linearly accelerating the motor from zero or starting speed to such preselected speed.

The control further includes a means for generating a first feedback signal which is proportional to and varies as a function of the speed of the motor. A second means is also included for providing a second feedback signal which varies with and is proportional to the speed of the motor being controlled.

A further means is provided for combining the reference signal and one of said feedback signals for obtaining an error or corrective signal. A time integrating device, such as a high gain amplifier which may be a differential amplifier with capacitance feedback, is included for integrating the corrective or error signal. Such high gain amplifiers are known also as operational amplifiers and are readily available from various commercial suppliers.

The time integrated signal, the reference signal and the second feedback signal are applied to a power amplification means, such as a magnetic amplifier.

The magnetic amplifier, whose magnetization level is a function of the aforementioned input signals, is used to fire a solid state switching device, such as a controlled rectifier. The solid state switching device in turn operates to control the energization of the armature of the DC motor to maintain the speed of the motor substantially equal to the preselected speed even under variable load conditions.

Another feature of the invention is that of a torque limit circuit which ensures that the torque generated by the motor is maintained at a level which substantially corresponds to the rated torque of the motor.

BRIEF DESCRIPTION OF THE DRAWINGS

FIGS. 2 and 2A disclose a circuit diagram of the present invention. Although the drawing is directed to a single phase control system, it will be understood that the invention is also applicable to multiple phase systems.

Referring now to FIG. 1, there is indicated a motor 1, the speed of which is to be controlled. A reference signal voltage source 109 is connected to an acceleration circuit 101. The acceleration circuit 101, as will be more fully explained hereinafter, provides for substantially linearly accelerating the motor linearly from zero or starting speed to the preselected speed corresponding to the setting of the reference signal voltage source 109. The output of the acceleration circuit is applied to a summing junction SJ and amplifier and summing means 10. A feedback signal developed by tachometer generator 120 which is proportional to the speed of motor 1 is applied also to amplifier and summing means 10. A back EMF feedback signal developed by means 130 and also proportional to the speed of motor 1 is also applied to summing means and amplifier 10.

Figure 1:
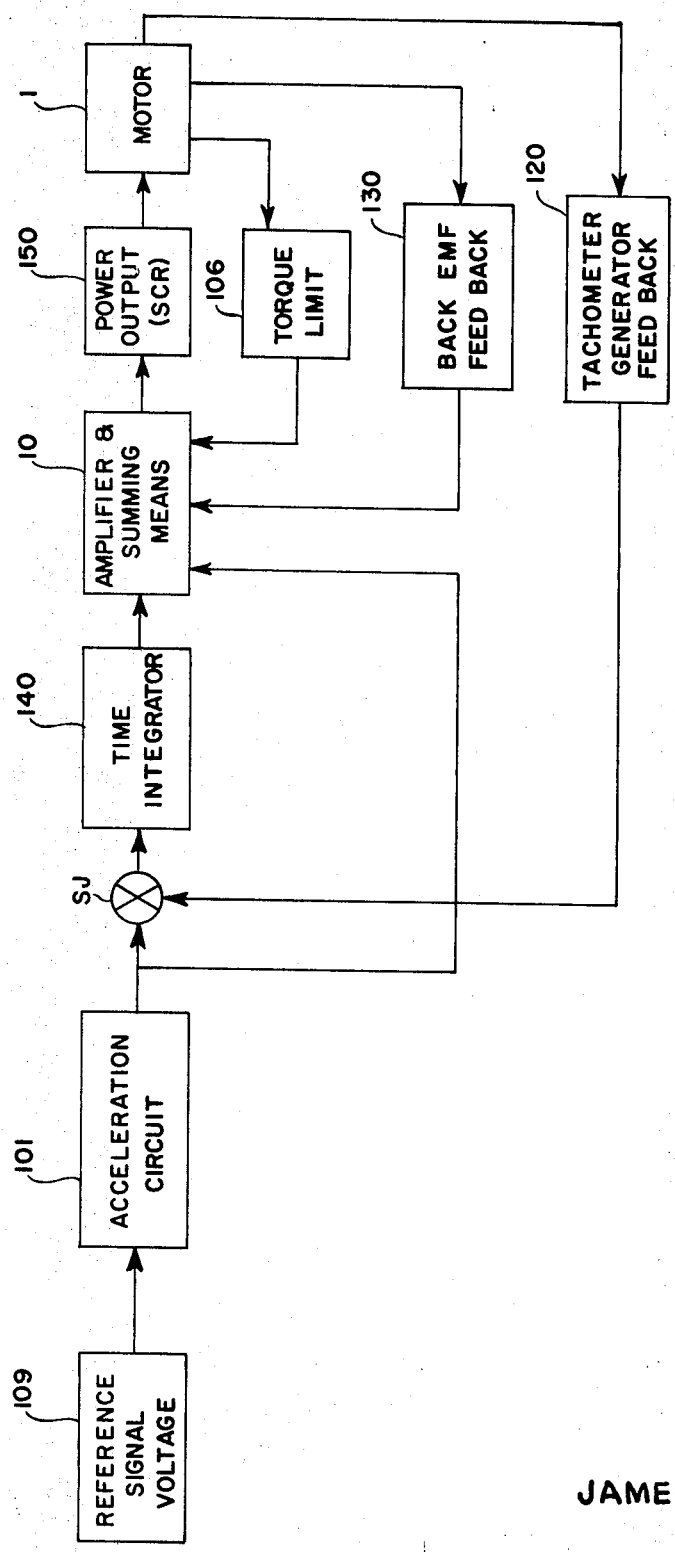
FIG. 1 is a block diagram illustrating the major components of this embodiment and their interconnections.

A time integrator 140 operates to integrate the algebraic sum of the reference and tachometer feedback signals over a given interval of time. The output signal of the time integrator 140 is also applied to summing means and amplifier 10.

A signal which is proportional to the torque developed by the motor 1 is applied to the torque limit circuit 106. The output of the torque limit circuit is also applied to the amplifier and summing means 10. The torque limit circuit 106, as will be more fully explained hereinafter operates to ensure that the torque generated by the motor is maintained substantially at a predetermined level which normally corresponds to the rated torque of the motor.

Summing means and amplifier 10 operate to a'gebraically add each of its input signals and trigger or fire at various phase angles the controlled rectifiers of power output means 150 to deliver controlled power to the armature of the motor 1 for effectively maintaining the speed of the motor substantially equal to that set by the reference source 109.

Summing means and amplifier 10 also operates in response to torque limit circuit 106 to control the power delivered to the armature of motor 1 so that the torque developed by the motor is maintained substantially equal to the setting of the torque limit circuit.

Thus, it will be readily understood hereinafter that the block diagram of FIG. 1 constitutes a control wherein the speed of a DC motor is maintained substantially equal to that of the preselected speed. A difference of 0.1 percent between the preselected speed and the actual motor speed has been achieved in a control of this nature.

Figure 2:
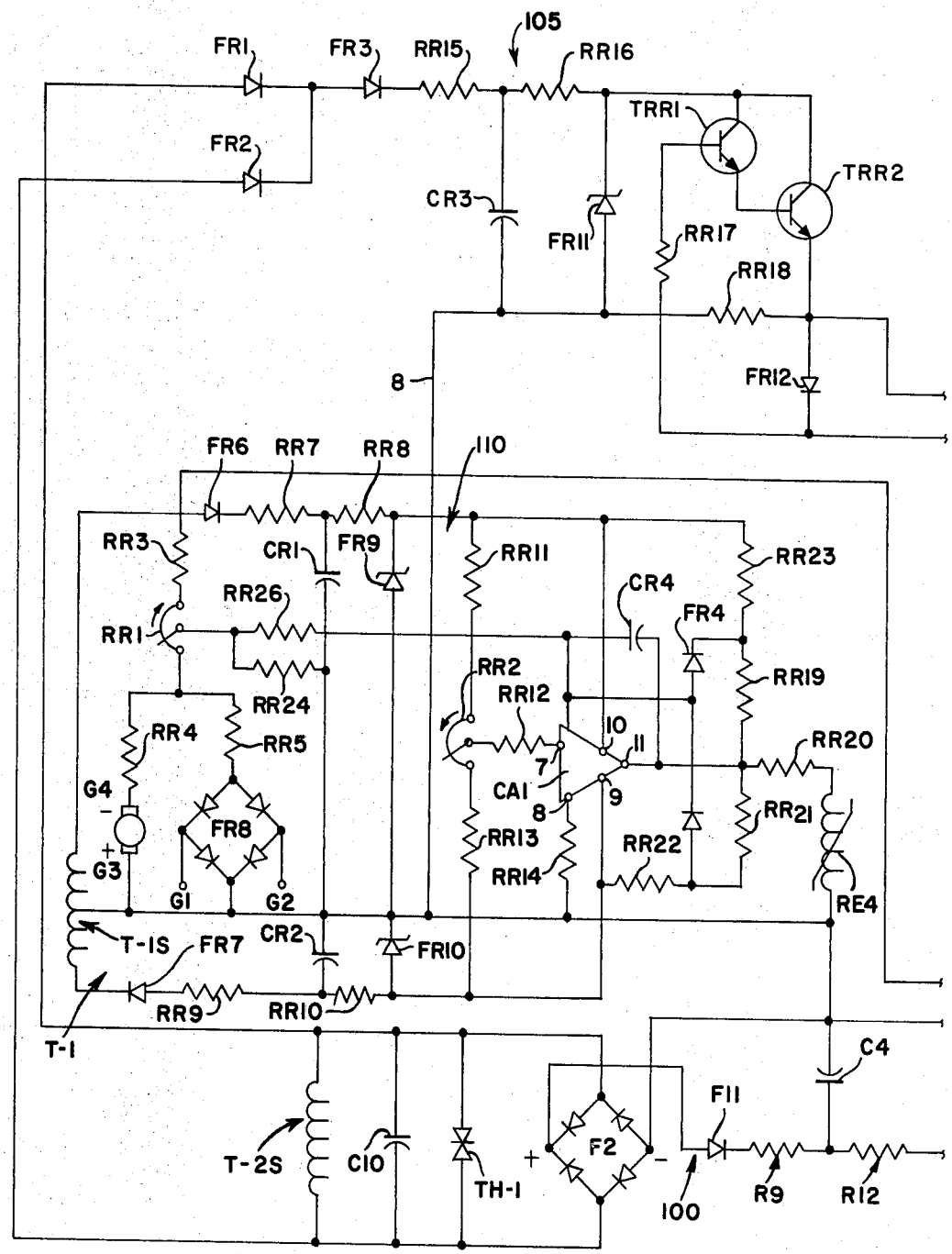

Referring now to FIGS. 2 and 2A there is shown a secondary winding T2–S of a transformer T2 which is used as the power input source for a regulated power supply 100. Secondary winding T2–S is shunted by a transient suppressing network including a thyrite suppressor TH1 and a capacitor C10. Connected across the secondary winding T2–S of transformer T2 and constituting a part of the power supply is a full wave rectifier F2 consisting of four diodes connected in a bridge configuration. One output terminal of the bridge rectifier circuit F2 is connected to the anode of rectifier F11. The other output terminal of rectifier F2 is connected to a common bus 8. The cathode electrode of diode F11 is connected to resistor R9 which forms part of a filter network which also includes capacitor C4 and resistor R12. This filter network operates to remove the AC appearing in the output signal of the full wave rectifier bridge F2. The output of the filter circuit is connected across a Zener diode F10. The Zener diode F10 is a voltage regulator means for maintaining the output voltage of the power supply substantially stable.

Connected between common bus 8 and the cathode of the Zener diode F10 is a reference speed circuit 109 consisting of a maximum speed variable resistance R21 connected in series with a reference speed potentiometer R50. Potentiometer R50 includes a wiper arm 5, the position of which can be manually adjusted for determining or selecting a preselected speed of the motor 1. In other words, the potential appearing between the wiper arm 5 and the common bus 8 is proportional to the preselected speed of the DC motor 1 which is to be controlled.

Connected between the wiper arm 5 of the reference speed potentiometer R50 and common bus 8 is a linear acceleration circuit 101. Acceleration circuit 101 includes resistor R13, a parallel capacitance network C5 and C7, a resistor R14, a variable resistance R3, diode F12 and transistor TR3. This circuit operates to accelerate the DC motor 1 at a substantially linear rate from zero or starting speed to a speed corresponding to that set by reference potentiometer R50 in a manner which will be more fully explained hereinafter.

The output of the linear acceleration circuit 101 appears across resistor RR15 which is connected in series with resistor RR17 and the base electrode of transistor TRR1. The emitter electrode of transistor TRR1 is connected to the base electrode of transistor TRR2. The collector electrodes of transistors TRR1 and RR2 are connected together. The emitter electrode of transistor TRR2 is connected to a junction point consisting of resistor RR18, anode electrode of diode FR12 and one end of winding RE1 of a magnetic amplifier 10. Magnetic amplifier 10 includes windings RE1, RE2, RE3 and RE4, all of which are wound on a common saturable iron core.

The voltage appearing across the secondary winding T2–S of transformer T2 is also connected to a full wave rectifier circuit consisting of diodes FR1 and FR2. Diodes FR1 and FR2 are connected to a second regulated power supply 105. The output of full wave rectifiers FR1 and FR2 is applied to the anode electrode of diode FR3. A filter network consisting of resistors RR15 and RR16 and capacitor CR3 is connected between common bus 8 and the cathode electrode of diode FR3. The output of this filter circuit is connected across a Zener diode FR11 which operates as a voltage regulator means to ensure that the output voltage from regulated power supply 105 is substantially stable. The output of regulated power supply 105 is in turn applied to the circuit consisting of transistors TRR1 and TRR2. Transistors TRR1 and TRR2 compensate for the nonlinearity present in the reference potentiometer R50 which is not totally compensated for by the linear acceleration circuit 101. Thus, a potential corresponding to that set by the reference potentiometer R50 is applied to the winding RE1 of magnetic amplifier 10 by means of acceleration circuit 101, resistors R13, RR15 and a circuit which includes transistors TRR1 and TRR2.

In series with winding RE1 are resistors R7 and R8 which are connected to one end of armature 2 of the DC motor 1. A signal corresponding to the back EMF of the DC motor is developed across resistors R7 and R8, the magnitude of such signal being proportional to the speed of the DC motor.

Power is applied to the armature member of the DC motor 1 by means of a bridge circuit consisting of diodes F16, F17 and solid state switching devices such as controlled rectifiers SCR1 and SCR2 which constitute a power output means 150. Each of the controlled rectifiers is shunted by a transient suppressing network comprising a pair of resistors RS1 and RS2 and a capacitor CS1. The input voltage is supplied to this bridge circuit by the primary windings of transformer T2.

In series with armature winding 2 is a field winding 3 overload relay 4, resistor R17 and capacitor C8 connected to the anode electrodes of controlled rectifiers SCR1 and SCR2.

A current or torque limit circuit 106 is connected between a junction point of resistor R17 and capacitor C8 and the common bus 8. The current or torque limit circuit includes a capacitor C9 in parallel with a potentiometer R5 and resistor R20. A wiper arm 6 of potentiometer R5 is connected to the base electrode of transistor TR2. The emitter electrode of transistor TR2 is connected to common bus 8 and the collector electrode is connected in series with resistors R21 and R22. A diode F16 is connected in shunt across resistor R22.

A second transistor TR1 is connected with its emitter-collector circuit, including diode F14, between common bus 8 and a junction point which includes resistors RR15, R22 and diode F16. The base of transistor TR1 is coupled to common bus 8 by a parallel capacitor network consisting of capacitors C11 and C12. As will be more fully explained hereinafter, the setting of wiper arm 6 of potentiometer R5 will control the current or torque limit of the DC motor 1. In most applications the wiper arm 6 of potentiometer R5 will be set so as to correspond substantially to the torque rating of the DC motor which is to be controlled.

A further means for determining the speed of the DC motor 1 consists of either an AC or DC tachometer generator connected across terminals G1 and G2 or terminals G3 and G4 respectively. In the event an AC tachometer generator is employed, its output signal is applied to a full wave rectifier FR8 resulting in a DC signal appearing across resistor RR5, which is proportional to the speed of the DC motor 1. Such a rectifier, of course, is unnecessary in the event a DC tachometer generator is used. In which case a signal is developed across resistor RR4 which is proportional to the speed of the DC motor. The signal appearing across resistors RR4 or RR5 is connected in series opposition with the reference signal developed by potentiometer R50 in a manner which will now be explained.

The reference signal is coupled to one side of a potentiometer RR1 by resistor RR3. The other side of the potentiometer RR1 is connected to either resistor RR4 or RR5. As a result an error or corrective signal which is proportional to the difference between the actual speed and the preselected speed of the DC motor 1 is developed. Such error signal appears across resistor RR24 and is applied to the input terminal 7 of a high gain or operational amplifier OA1 through RR26.

Diodes FR6, FR7 and filter networks consisting of resistors RR7, RR8, capacitor CR1 and resistors RR9, RR10, capacitor CR2 are connected across secondary windings T-1S of transformer T-1. Such components operate as regulated power supplies 110 and 111 whose outputs are maintained substantially stable by means of Zener diodes FR9 and FR10 respectively. The output of power supplies 110 and 111 areconnected to the operational amplifier OA1. A bias voltage supply consisting of potentiometer RR2 and resistors RR11 and RR13 which operate as a voltage divider is employed for properly biasing the operational amplifier OA1.

The output signal from terminal 11 of the operational amplifier OA1 is coupled back to the negative input terminal 7 through feedback capacitor CR4. As a result, the amplifier OA1 is caused to function in a conventional manner as a time integrator of the signal applied to its negative input 7. The time $t$ over which the integration is performed is determined by the resistance value of RR12 and the value of the capacitor CR4 as multiplied by the gain of the amplifier OA1. The operation of the integrator circuit is that of a resistance capacitance network in which an effective capacitance larger than that which is easily provided in available units is obtained by using a circuit including active elements as a capacitance multiplier. The time constant $t$ of the integrated system is chosen so to be substantially larger than the response time of the non-integrating feedback loop including the mechanical components, such as the motor.

The output siganl from terminal 11 of amplifier OA1 is also coupled through resistor RR20 to winding RE4 of the magnetic amplifier 10. Thus, the magnetic state of the magnetic amplifier 10 is modulated or changed in accordance with the magnitude of the time integrated corrective signal of operational amplifier OA1.

The operation of the control circuit is as follows. A reference potential or signal proportional to the preselected speed of the DC motor 1 is developed between the wiper arm 5 of potentiometer R50 and the common bus 8. As explained above, this reference potential is dependent upon the position or setting of the wiper arm 5 which can be manually adjusted. The reference signal is applied to the input of the linear acceleration circuit 101. The acceleration rate of the motor 1 is determined by the positioning of movable contact 12 of the variable resistance R3 which controls the conduction of transistor TR3.

With TR3 being normally cutoff, capacitors C5 and C7 will charge to a voltage level depending upon the setting of potentiometer R50. The rate of charge is a function of the variable resistance R3. The charge path includes variable resistance R3 and resistor R14 to one side of the capacitors C5 and C7. When the charge on capacitors C5 and C7 reaches a value sufficient to overcome the bias applied to transistor TR3 by resistor R3, TR3 will be rendered conductive. Thus, a low impedance path is provided through the collector-emitter circuit of transistor TR3. As a result, capacitors C5 and C7 will discharge over a path including resistor R13, wiper arm 5 of potentiometer R50, bottom half of potentiometer R50 to common bus 8. Accordingly, an output signal is produced across resistor R13. This output signal is a time integrated reference signal. The time interval for such integration is determined by the position of the movable arm of resistor R3 and results in a substantially linear increase of current being applied to magnetic amplifier 10. As a result, the speed of the DC motor will increase from zero or starting speed to a preselected speed at a substantially linear rate.

The integrated reference signal is coupled by resistors RR15 and RR17 to the base electrode of transistor TRR1. Transistors TRR1 and TRR2 function to further refine the linear acceleration rate obtained by the acceleration circuit 101. In other words, transistors TRR1 and TRR2 operate to improve the linear acceleration rate of the motor. The output of the transistor circuit consisting of TRR1 and TRR2 is applied to winding RE1 of the magnetic amplifier 10.

The magnetic amplifier 10 operates to apply a pulse to the gate electrodes of controlled rectifiers SCR1 and SCR2. The time or phase angle at which said pulses are applied is dependent upon the magnetization level of the magnetic amplifier 10. Such gate signals cause the controlled rectifiers to conduct at a particular phase angle during each half-cycle of the AC input signal. For example, during the positive half-cycle of the input signal, SCR2 will be rendered conductive and SCR1 will be rendered conductive during each negative half-cycle of the input signal.

As a result, current will flow through line L1, fuse F41, diode F16 closed contact K10 to the armature and field windings 2 and 3 respectively of the DC motor 1, causing the motor to accelerate to a preselected speed set by reference potentiometer R50 at a substantially linear rate due to the operation of acceleratiton circuit 101. Armature current will flow from the armature and series field windings 2 and 3 respectively to common bus 8 through a parallel resistance circuit consisting of resistors R33 and R33a and through a circuit consisting of resistor R17, potentiometer R5 and resistor R20. From common bus 8 the armature current will flow through the anode-cathode circuit of controlled rectifier SCR2, fuse F42 to the other side of the input transformer via line L2.

Assume for the purposes of example, that an AC tachometer generator is employed. As a result a signal will be developed across terminals G1 and G2 which is proportional to the speed of the DC motor 1. This AC signal is rectified by full wave rectifier bridge FR8 and is coupled by resistance RR5 to one end of potentiometer RR1. The reference signal from potentiometer R50 is applied to the other end of potentiometer RR1 through resistance RR3. As a result, a feedback signal proportional to the speed of the motor is connected in series opposition with reference signal which is proportional to the preselected motor speed. Accordingly, an error or corrective signal is developed which is proportional to the difference between the actual speed and the preselected speed of the motor. This error signal is connected by resistor RR26 to the input terminal 7 of operational amplifier OA1.

The operational amplifier OA1 in cooperatiton with capacitor CR4 operates to time integrate a large amount of the feedback signal. The time of integration is substantially longer than the inherent response time of the feedback loop so that system instability is avoided. The time integrated corrective signal appearing at terminal 11 of operational amplifier OA1 is coupled by resistor RR20 to winding RE4 of the magnetic amplifier 10.

Another feedback signal proportional to the speed of the DC motor is developed across resistors R7 and R8 and corresponds to the back EMF generated by the DC motor. This back EMF feedback signal is also applied to winding RE1 of the magnetic amplifier 10. As a result, the magnetization level of magnetic amplifier 10 is a function of the time integrated error signal, the reference signal and the feedback signal corresponding to the back EMF of the motor.

Accordingly, the firing of controlled rectifiers SCR1 and SCR2 is controlled in such a manner that the motor will run at a speed corresponding to the preselected speed under variable load conditions.

It will further be understood that it is possible to obtain speed control of motor 1 by eliminating the operational amplifier OA1 and applying to winding RE4, a corrective signal which has not been time integrated. However, by including the operational amplifier resulting in a time integrated error signal, the time response of the system is considerably improved upon. For example, the actual motor speed when employing the operational amplifier may vary from the preselected speed by approximately 0.1 percent even under variable load conditions.

The torque limit circuit consisting of transistors TR1 and TR2 and their associated circuitry will now be described. As is well known in the art, the torque generated by the DC motor is proportional to the current flowing through its armature. The wiper arm 6 of potentiometer R5 is set to a particular level of torque which is desired such as the torque or current rating of the motor which is being controlled. In the event the armature current exceeds this rated value, a voltage between wiper arm 6 of potentiometer R5 and common bus 8 will cause transistor TR2 to conduct. With TR2 conducting, current will flow from the junction of resistors RR15 and R13 through resistor R22, resistor R21, the collector-emitter path of transistor TR2 to common bus 8. Such will cause the base of transistor TR1 to become negative with respect to its emitter, rendering transistor TR1 conductive. Capacitors C11 and C12 provide a coupling between the emitter electrode of transistor TR2 and the base electrode of transistor TR1, which causes transistor TR1 to be driven further into saturation.

As a result, current flowing through resistors R13 and RR15 which is proportional to that of the reference signal is altered or decreased resulting in lower current applied to the magnetic amplifier winding RE1, thus causing the phase angle at which controlled rectifiers SCR1 and SCR2 conduct, to be retarded. This action decreases the current flowing through the armature winding 2 of the DC motor, preventing the motor from being damaged.

It will be understood that during the alternate half-cycle of the AC input voltage, the operation will be the same except that the other half of the power bridge including controlled rectifiers SCR1 and diode F17 will provide current to armature winding 2 of the DC motor 1.

Furthermore, as mentioned previously, this system is also capable of being adapted to a three phase control wherein a third controlled rectifier and diode are employed resulting in the conduction of each controlled rectifier occurring during cycles of 120 degrees.

In view of the above, it will be seen that the several objects of the invention are achieved and other advantageous results attained. As various changes could be made in the above constructions without departing from the scope of the invention, it is intended that all matter contained in the above description and shown in the accompanying drawings be interpreted as illustrative and not in a limiting sense.

What I claim is:
1. In a DC motor having an armature member including a winding, the energization of which controls the speed of said motor:
   a source of electrical power; and a solid state switching device interconnected between said source and said winding and adapted to selectively control the energization of said winding to regulate the speed of said motor;
   a control for said switching device comprising:
      means for producing a reference signal proportional to a preselected speed of said motor;
      means for producing a first feedback signal which is proportional to and varies as a function of the speed of said motor;
      means for producing a second feedback signal which is proportional to and varies as a function of the speed of said motor;
      means for combining said reference signal and said first feedback signal to obtain a corrective signal;
      means for time integrating said corrective signal, said integration means comprising a resistance capacitance network which includes a high gain amplifier with capacitive-negative feedback whereby the actual capacitance necessary to obtain long term integration is substantially reduced;
      and means including a magnetic amplifier responsive to said time integrated signal, said reference signal and said second feedback signal for selectively activating said switching device to maintain the speed of said motor substantially equal to said preselected speed.

2. Apparatus in claim 1 wherein said means for producing said first feedback signal comprises a tachometer generator and said means for producing said second feedback signal comprises means for detecting the back EMF generated by said DC motor.

3. The apparatus in claim 1 wherein said solid state switching device comprises a controlled rectifier.

4. Apparatus according to claim 1 wherein said reference signal means includes a means for accelerating said motor to said preselected speed at a substantially linear rate.

5. Apparatus according to claim 4 wherein said acceleration means includes an integrating circuit consisting of a resistance-capacitance network whereby the resistance varies as a function of the magnitude of said reference signal.

6. Apparatus according to claim 5 wherein said variable resistance comprises a transistor.

7. Apparatus in claim 1 wherein said control includes a transistorized means for limiting the current applied to the armature of said motor whereby the torque generated by said driven member is maintained substantially equal to a predetermined value.

References Cited
UNITED STATES PATENTS

| 3,348,107 | 10/1967 | Hamby | 318—318 X |
| 3,465,228 | 9/1969 | Long et al. | 318—328 |
| 2,847,632 | 8/1958 | Harvey et al. | 318—345 X |
| 3,383,578 | 5/1968 | Lewis | 318—326 X |

ORIS L. RADER, Primary Examiner

ROBERT J. HICKEY, Assistant Examiner

U.S. Cl. X.R.

318—327